United States Patent [19]

Healey et al.

[11] 4,187,543
[45] Feb. 5, 1980

[54] TEMPERATURE CONTROL OF CHILL WATER AND STEAM IN HEATING, VENTILATION, AIR CONDITIONING (HVAC) SYSTEMS

[75] Inventors: David M. Healey, Feeding Hills, Mass.; John E. Games, Granby, Conn.

[73] Assignee: United Technologies Corporation, Hartford, Conn.

[21] Appl. No.: 845,110

[22] Filed: Oct. 25, 1977

[51] Int. Cl.² .......................... G06F 15/46; F24F 3/00
[52] U.S. Cl. ...................................... 364/505; 165/22; 165/26; 364/118
[58] Field of Search ............... 364/118, 505; 318/609, 318/610; 165/12, 13, 16, 22, 26, 30; 236/1 B, 1 C, DIG. 8

[56] References Cited

U.S. PATENT DOCUMENTS

| | | | |
|---|---|---|---|
| 3,820,713 | 6/1974 | Demaray | 165/22 X |
| 3,826,305 | 7/1974 | Fishman | 165/26 |
| 3,834,617 | 9/1974 | Dyntar | 165/26 X |
| 3,949,807 | 4/1976 | Tyler | 165/22 X |
| 3,951,205 | 4/1976 | Zilbermann | 165/16 |
| 3,979,922 | 9/1976 | Shauit | 165/16 X |
| 4,013,118 | 3/1977 | Zimmer et al. | 165/22 |

*Primary Examiner*—Jerry Smith
*Attorney, Agent, or Firm*—Dominic J. Chiantera

[57] ABSTRACT

Apparatus for controlling the discharge temperature of thermal fluid presented from a common thermal source to one or more HVAC systems in a network, each HVAC controlling the volume of thermal fluid circulating therethrough by regulating the valve position of HVAC valve apparatus over a valve position range from a full closed position to a full open position in dependence on the thermal energy level required by one or more temperature regulated living spaces associated with each HVAC, the apparatus including electronic processing means in combination with dedicated temperature and valve position sensing apparatus for providing actual position signals for each fluid valve apparatus and an actual source discharge temperature signal, the electronic processing means determining the magnitude of the greatest thermal energy demand within a short term interval in dependence on the most open of the actual valve position signals and providing modulation of the source discharge temperature over the short term interval in dependence on the magnitude of the greatest thermal energy demand.

11 Claims, 10 Drawing Figures though the location of the individual HVAC systems in the net-work at various site locations which may be relatively remote from each other and from the location of the common source adjusting the discharge temperature set point as necessary to satisfy the short term energy demands of the network has been impractical, if not impossible due to the inability to accurately determine the short term thermal energy demand of the individual HVACs in the system. Therefore, the prior art systems control the discharge temperature to the anticipated worst case condition to ensure the comfort of the occupants of the various living spaces. As may be appreciated, the result is wasteful energy consumption in favor of ensuring adequate system performance.

TEMPERATURE CONTROL OF CHILL WATER AND STEAM IN HEATING, VENTILATION, AIR CONDITIONING (HVAC) SYSTEMS

CROSS REFERENCE TO RELATED APPLICATIONS

Portions of the subject matter hereof are also disclosed in one or more of the following, commonly owned, copending applications entitled ENERGY CONSERVATIVE CONTROL OF HEATING, VENTILATING, AND AIR CONDITIONING (HVAC) SYSTEMS, Ser. No. 829,379, filed on Aug. 31, 1977 by John E. Games et al, and ENERGY CONSERVATIVE CONTROL OF TERMINAL REHEAT HEATING, VENTILATING, AND AIR CONDITIONING (HVAC) SYSTEMS, Ser. No. 836,118, filed on Sept. 23, 1977 by William W. Bitterli et al.

BACKGROUND OF THE INVENTION

1. Field of the Invention

This invention relates to apparatus for controlling the discharge temperature of a common thermal source providing thermal fluid to one or more HVAC systems in a network, and more particularly to electronic processing apparatus for controlling the common thermal source such as to modulate the discharge temperature of the thermal fluid in dependence on the HVAC system having the highest thermal energy demand.

2. Description of the Prior Art

As may be known, HVAC systems are used for controlling the environmental temperature conditions in one or a plurality of structurally enclosed living spaces associated with each system. The HVAC systems may be of a variety of well known types, such as multi-zone, dual duct, or terminal reheat type systems. In general, such HVAC systems include separate sources of heating and cooling within the system, however, they may include either heating or cooling apparatus alone. In large facilities, such as multi-storied office buildings, schools, or a facility comprising a complex of some number of individual buildings, a plurality of HVAC systems are used for controlling different segments of the facility, i.e. separate floors, or groups of floors in a multi-storied building, or separate buildings in a complex. In general, the plurality of HVAC systems in a single facility are connected in a network which is serviced by a common thermal source, which may include either, or both of a separate cold source and hot source, and which provides the thermal energy required by the heating and/or cooling apparatus of the individual HVAC systems of the network. As may be known, in the prior art HVAC networks each of the HVAC systems operates autonomously in responding to, and providing for the temperature regulation in the living spaces associated with that system. As such, each HVAC has separate thermal energy demands in dependence on the summation of the energy demands from all of the system spaces. In general, the prior art control systems for the common thermal source provide regulation of the souce discharge temperature at a set point temperature value which is preset for a given time period, i.e. a heating or cooling season, or possibly on a monthly or weekly interval to ensure a discharge temperature in satisfaction of the total demand from all of the HVAC systems in the network. The common source set point temperature may be changed by a main-

SUMMARY OF THE INVENTION

An object of the present invention is to provide a control system for modulating the discharge temperature of a common thermal source providing a thermal fluid to one or more HVAC systems in a network, in dependence on the HVAC system having the highest short term thermal energy demand.

According to the present invention, an HVAC network having a common thermal source for providing thermal fluid to one or more HVAC systems in the network, each of which control the volume of thermal fluid circulating therethrough in dependence on the thermal energy demand from temperature regulated living spaces associated therewith through position modulation of an associated fluid valve apparatus from a full closed position for a minimum volume to a full open position for a maximum volume, is provided with a control system having sensing apparatus adapted to be disposed within the network, including position sensing apparatus adapted to be disposed in each of the HVAC systems in the network for providing an actual valve position signal representative of the position of the fluid valve apparatus in each HVAC, and further including temperature sensing apparatus adapted to be disposed in the common thermal source for providing an actual source discharge temperature signal, the control system further including electronic processing means, responsive to the actual valve position signals and the actual source discharge temperature signal from the sensing apparatus, for determining the magnitude of the greatest thermal energy demand within a short term interval in dependence on the most open of the actual valve position signals, the processing means further providing modulation of the source discharge temperature over the short term interval in dependence on the magnitude of the greatest thermal energy demand.

In further accord with the present invention, the electronic processing means includes a memory for storing signals, including valve position reference signals, each at a different position magnitude within the total range of travel of the HVAC fluid valve apparatus, all providing in combination, a quantizing of the total valve range of travel into a plurality of adjacent sub-ranges extending successively from a minimum sub-range near the full closed valve position to a maximum sub-range near the full open valve position, the memory further including a plurality of incremental temperature reference signals, each having a different incremental temperature value, and each associated with a different one of the plurality of sub-ranges, the electronic processing means further including apparatus for successively sampling periodically and for registering in the memory, successively sampled values of the actual valve position signals and the actual source discharge temperature signal, the electronic processing means comparing each of the actual valve positions in each sampling period with the valve position reference signals to determine the sub-range which bounds the most open of the actual valve position signals in each period, the electronic processing means providing the modulation of the source discharge temperature by incremental adjustment of the actual source discharge temperature signal sampled in each period, the incremental adjustment being provided by a selected one of the incremental temperature reference signal values in dependence on the sub-range identified. In still further accord with the present invention, the electronic processing means modulates the source discharge temperature by the incremental temperature value associated with a sub-range identified in a present sampling period, only in response to the same sub-range being identified in the immediately preceding sampling period. In still further accord with the present invention, the electronic processing means further includes apparatus responsive to operator control for providing parameter signals representative of the valve position reference signals and the incremental temperature reference signals, in response to selective operation thereof, and apparatus for registering the parameter signals in the memory.

DETAILED DESCRIPTION

Figure 1:
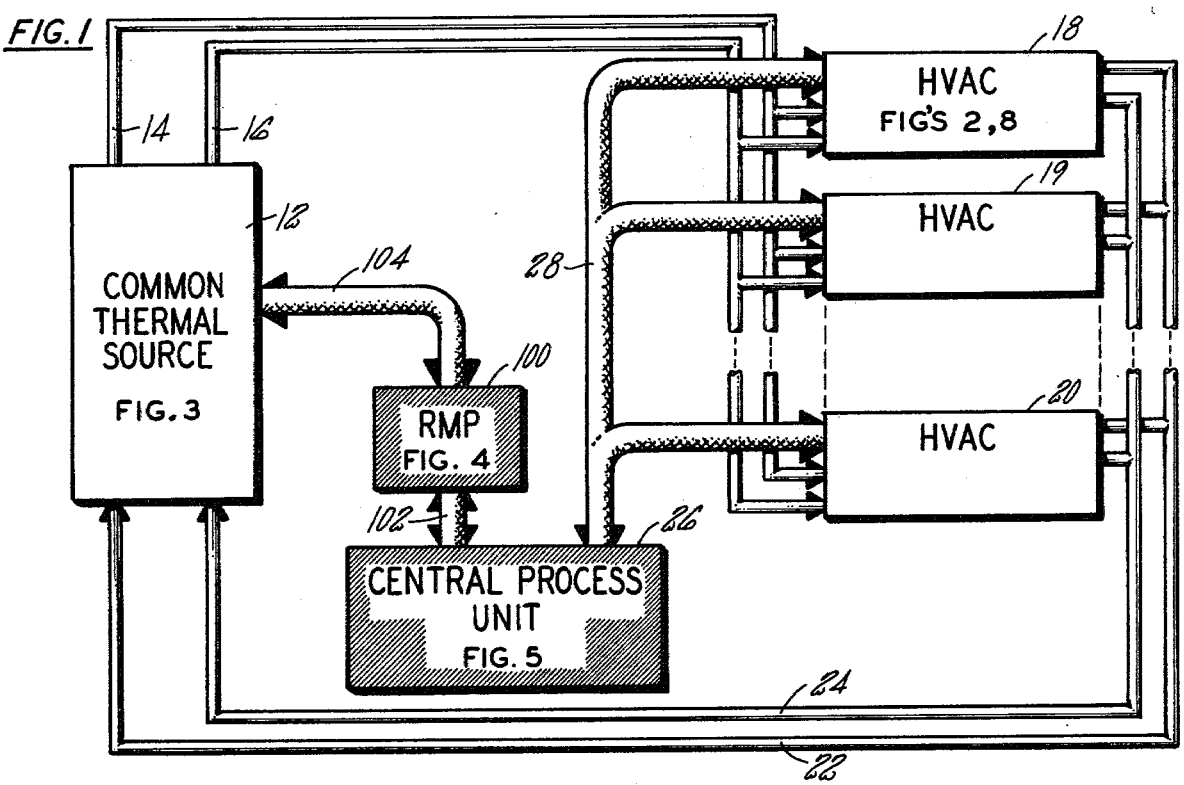
FIG. 1 is a simplified, schematic block diagram of an HVAC network having a common thermal source and including control apparatus according to the present invention.

Referring now to FIG. 1, in an illustration of an HVAC network serviced by a common thermal source, a thermal source 12 provides hot and cold fluid flow through supply lines 14, 16 to each of a plurality of HVAC systems 18-20. The HVAC systems 18-20 are identical and may include both heating and cooling apparatus, such as the multizone or dual duct type of HVAC, however, the present invention provides independent control over each of the hot and cold sources within the common thermal source such that the HVACs in the network may be of a type which include either heating or cooling apparatus alone. The fluid flow is returned from the HVACs 18-20 through return lines 22, 24 to the common thermal source. As may be known, the individual HVAC systems operate autonomously in response to the heating and cooling demands from the living spaces associated with the individual system. In the control of the present invention a central control unit, shown shaded for clarity of illustration, and which includes a central processing unit (CPU) 26, is interconnected between each of the HVAC systems and the common thermal source 12. The CPU 26 is connected through a trunk line 28 to the input of each HVAC and interfaces with the existing HVAC installation through the interface apparatus illustrated in FIG. 2.

Figure 2:
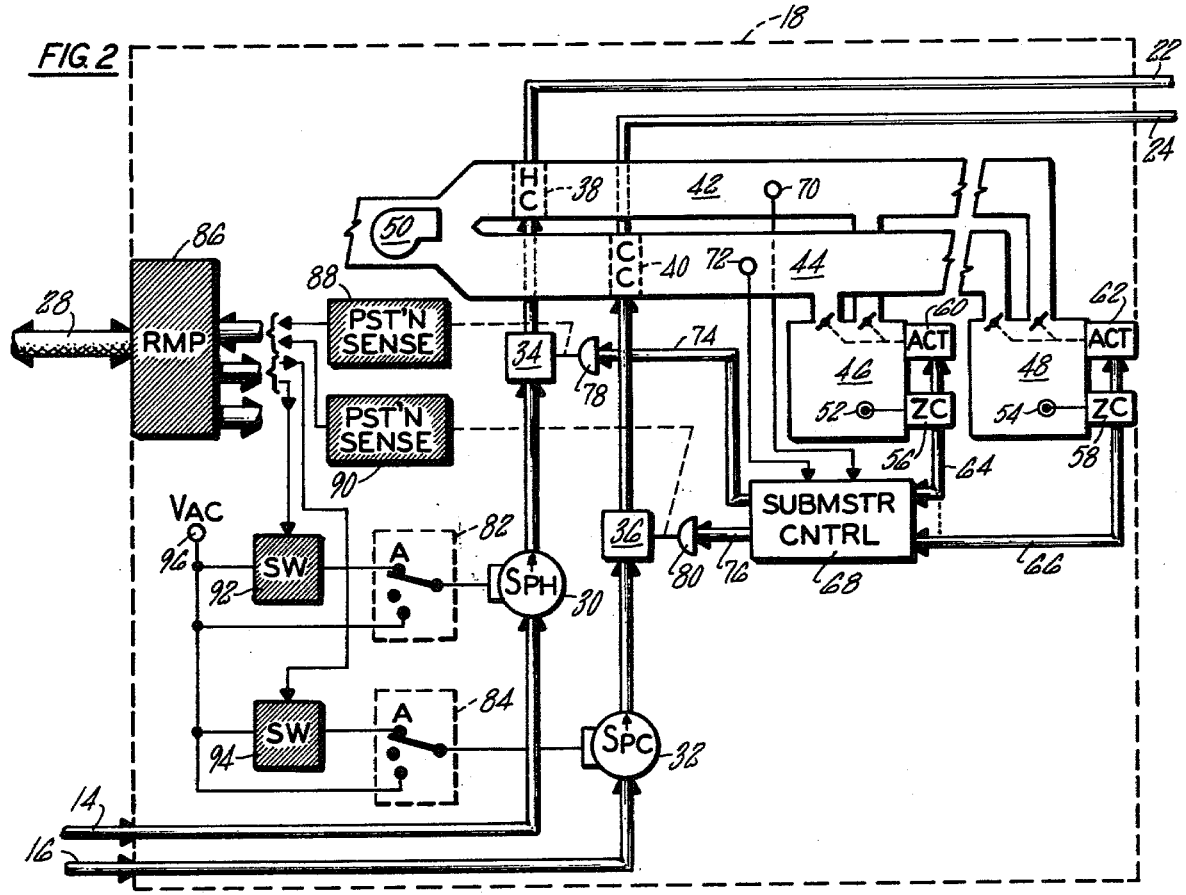
FIG. 2 is a schematic block diagram of an HVAC system used in the network of FIG. 1, and including interface apparatus required for the control system of the present invention.

Referring now to FIG. 2, in an illustration of a typical prior art dual-duct HVAC system, the hot and cold fluid flow in the lines 14, 16 is presented through secondary pumps 30, 32 to the input of associated hot and cold valve assemblies 34, 36. The output from the hot and cold valves are presented to corresponding heating and cooling apparatus such as a heating coil 38 and cooling coil 40, each disposed within a respective one of the hot and cold decks 42, 44 of the HVAC air handler apparatus. The coils 38, 40 discharge the hot and cold fluid flow through the return lines 22, 24 to the thermal source 12 (FIG. 1).

As known to those skilled in the art, the HVAC system controls the ambient temperature in one or more living spaces 46, 48 by forcing inlet air through the hot and cold decks 42, 44 with a supply fan 50, which passes the inlet air in heat exchange relationship through the heating and cooling coils 38, 40, where it is heated or cooled by the hot and cold fluid circulating through the coils prior to discharge into the spaces. The actual space temperatures are sensed with temperature sensors 52, 54 and presented to space thermostats, or controllers 56, 58, which compare the sensed signals to space reference temperatures set into each controller by the human occupant, and which provide space temperature error signals representative of temperature differences therebetween to associated space damper actuators 60, 62, and through lines 64, 66 to the input of a submaster control 68. The submaster control also receives actual discharge temperature signals from the hot and cold decks 42, 44 from temperature sensors 70, 72. In the typical prior art HVAC system, the submaster control 68 provides proportional gain control over the position of the hot and cold valves 34, 36 to attempt regulation of the discharge temperature from the hot and cold decks. In operation, the submaster control compares the sensed discharge temperature from the hot and cold decks with a deck reference temperature which is equal to the summation of a fixed set point temperature reference, preset within the submaster control by the maintenance operator, and the product of the corresponding hottest and coldest space temperature error signals multiplied by a proportional gain term. The control 68 provides pneumatic signals representative of a temperature difference between the actual sensed deck discharge temperature and the deck reference temperature value through lines 74, 76 to pneumatic actuators 78, 80 associated with the hot and cold valves 34, 36. The actuators 78, 80 provide position modulation of the valves over a total valve position range from full closed to full open, thereby regulating the volume of the hot and cold fluid circulating through the system in response to the magnitude of the signal on the lines 74, 76, in an attempt to regulate the discharge temperature from each of the decks. The secondary pumps 30, 32 which circulate the hot and cold fluid through the HVAC are energized through manually operable switch assemblies 82, 84, which are selectably operable to allow a shutdown of the secondary pumps for repair, or maintenance, or perhaps seasonal shutdown, otherwise the pumps are continually energized.

The prior art HVAC system is interfaced with the CPU 26 through a remote microprocessor (RMP) 36, valve position sensing circuitry 88, 90 and voltage controlled switches 92, 94. The interface apparatus provides information on the position of the valve 34, 36 to the CPU, in addition to allowing remote actuation of the secondary pumps 30, 32 by the CPU. The position sensing circuitry 88, 90 may be any one of a number of types known in the art including potentiometers which are mechanically linked to the shaft of the pneumatic actuators 78, 80 and which provide an explicit measurement of the instantaneous valve position. Alternatively, position sensing may be obtained implicitly through the use of pressure sensing apparatus, such as linear pressure transducers, installed in each of the pneumatic lines 74, 76 to measure the magnitude of the pneumatic signals and determine the commanded valve position values, or, as described hereinafter with respect to FIG. 8, when the control of the present invention is used in combination with the central HVAC control system disclosed in the hereinbefore referenced application to Games et al, the central HVAC control interface apparatus provides the valve position information directly to the CPU 26. In summary, the choice of the manner in which valve position information is obtained is governed by both practical considerations of installation which may vary between difference HVAC systems, and also accuracy of measurement, i.e. the signal tolerances associated therewith. The techniques of providing the valve position sensed information are well known and the position sensed circuitry 88, 90 of FIG. 2 merely illustrates a generic interface which provides the required sensed information.

Remote control over actuation of the secondary pumps 30, 32 is provided through the voltage controlled switches 92, 94 which are interconnected between a source of AC voltage 96 and an automatic (A) contact on each of the manually operated switches 82, 84. The switches 92, 94 are of a type known in the art which provide electrical connection between the source 96 and the A contact of the manually operated switches in response to a discrete electrical signal, or gate signal, presented to a gate input thereof. With the manual switches 82, 84 positioned in the A contact location, the CPU 26 (FIG. 1) may provide selectable operation of each of the pumps 30, 32.

The position sensed information from the sensing circuitry 88, 90 and the discrete gate signals to the switches 92, 94 are presented to and from the CPU 26 through the RMP 26. The use of a remote microprocessor installed at each HVAC system site is deemed desirable, to provide interim storage of sensed position information, and to provide signal conditioning of signal data, or information, presented to, and received from, the CPU. The signal conditioning is required, since generally the HVACs are physically located in various facilities, or buildings, which are themselves at some remote distance from the location of the CPU. In order to prevent signal attenuation and distortion over the long transmittal distances between the CPU and the various HVACs, the RMPs provide the signal conditioning and analog-to-digital conversion of the sensed position information prior to transmittal to the CPU. In addition the restoration of the gate signals received from the CPU ensure the accurate switching of the gate switches.

Although all of the functions performed by the RMP, other than the signal conditioning function, may be provided in the CPU itself, the RMP is further preferred since it provides data compacting and front end data processing of the sensed signal information in addition to the interim data storage, all of which allows a freeing up of the CPU which reduces the actual computer time and allows the CPU to perform other tasks. Although the use of an RMP in combination with the CPU is preferred, its use is dependent on the particular implementation of the present invention and may be found to be unnecessary.

Figure 3:
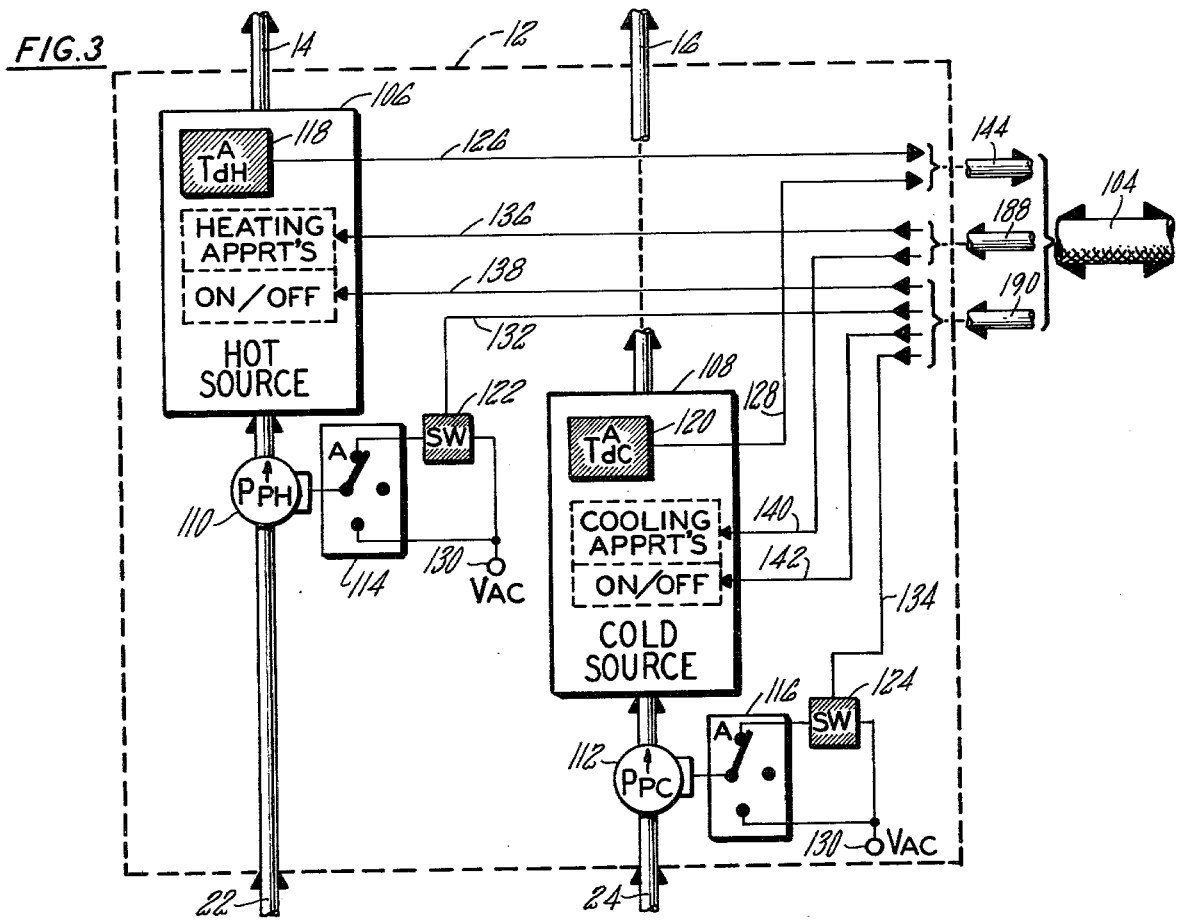
FIG. 3 is a simplified, schematic block diagram of a common thermal source as may be used in the network of FIG. 1, illustrating the interface apparatus required by the control system of the present invention.

Referring again to FIG. 1, the interconnection between the CPU 26 and the common thermal source 12 is provided through a separate RMP 100. The CPU 26 is connected through a trunk line 102 to the RMP, which is connected to the thermal source through a separate trunk line 104. Referring now to FIG. 3, the common thermal source 12 includes a hot source 106 and cold source 108 each having associated primary pumps 110, 112. The primary pumps 110, 112 are energized through manually operable switch assemblies 114, 116 which allow selectable operation of the primary pumps and shutdown of the pumps for repair, maintenance, or seasonal shutdown. According to the present invention, interface apparatus including temperature sensors 118, 120 and voltage controlled switches 122, 124, all shown shaded for clarity of illustration, are added to the thermal source 12 to provide the required interface between the source 12 and the CPU 26. The temperature sensors are of the type known in the art, such as resistance temperature sensors comprised of ultraprecision nickel wire for measuring the discharge temperature from the hot and cold sources over a typical temperature range of from $-40°$ to $+250°$ F., with a temperature sufficient on the order of $+3$ ohms per degree F. The temperature sensor 118 is installed in the hot source 106 and provides an actual, hot fluid discharge temperature signal ($T_{dH}^4$) on a line 126. Similarly, the temperature sensor 120 is installed in the cold source 108 and provides an actual, cold fluid discharge temperature signal ($T_{dC}^4$) on the line 128. The voltage controlled switches 122, 124 are identical to the switches 92, 94 installed in the HVAC 18 of FIG. 2, and are interconnected between a source of AC voltage 130 and an automatic (A) contact on each of the manually operated switches 114, 116. The switches 122, 124 respond to discrete gate signals presented on lines 132, 134 from the RMP to provide electrical connection between the voltage source 130 and the A contact of the switches 114, 116.

The interface apparatus between the RMP 100 and the heating and cooling apparatus of the hot and cold sources 106, 108 is dependent on the particular type of hot and cold source included in the system. The hot source 106 may be a hot water type supply which uses a number of known methods of heating the hot water to the desired discharge temperature, i.e. steam heating of the hot water, or alternatively heating the hot water through the use of electrical or fossil fuel fired heaters. Similarly, the cold source 108 may comprise a chiller for providing a chilled water, which may be either of two basic types, a steam absorption type well known in the art, or an electrical type centrifugal chiller or reciprocating chiller with the control and sense apparatus differing with each. The CPU control of the degree of heating or cooling provided to the hot and cold fluid within the respective sources is, therefore, dependent on the type of heating and cooling apparatus used. In all cases, the final interface may be provided through well known techniques, such as modulating a feeder valve providing steam or fuel to a heating apparatus of the hot source, or alternatively regulating the current flow through an electrical heater. Similarly for a cold source comprising a steam absorption type chiller which includes an evaporator, a condensor, and a mixer stage, the control may include modulating the valve providing the lithium bromide to the mixer stage, thereby controlling the mixture ratio of lithium bromide to water within the mixer stage and subsequently the degree of cooling provided to the chill water by the chiller. Alternatively, the steam absorption chiller may be controlled by regulating the amount of steam presented to the evaporator stage through position control of a steam valve. For the electrical centrifugal chiller which uses a compressor to compress freon gas into liquid form, the CPU cooling control may be achieved through electrical control of inlet/outlet guide vanes within the compressor, or by turning sequentially activated pistons in the compressor, thereby controlling the amount of gas-to-liquid conversion and subsequently the amount of cooling of the chill water. To repeat, the heating and cooling apparatus used in the hot and cold sources are of types well known in the art, and the method of controlling the operation of each is similarly well known to those skilled in the art, therefore, the illustration of FIG. 3 represents a generic, or block diagram illustration of the interface between the CPU and the associated heating and cooling apparatus. In addition to providing linear control over the degree of heating or cooling provided by the apparatus within the sources, the CPU also provides discrete control over actuation of the heating and cooling apparatus, such that a complete turn-off of each of the hot and cold sources may be accomplished remotely from the CPU.

The connection between the RMP 100 and the heating apparatus of the hot source 106 is provided through the lines 136, 138, and interconnection with the cooling apparatus within a cold source 108 is provided through the lines 140, 142. The analog sensed signals from the temperature sensors 118, 120 on the lines 126, 128 are presented to the RMP 100 in a common conduit 144 within the trunk line 104. The analog signals from the RMP 100 on the lines 136, 140 are presented through a common conduit 188, and the discrete electrical signals from the RMP on the lines 132, 134, 138, and 142 are presented from a conduit 190, both within the trunk line 104.

Figure 4:
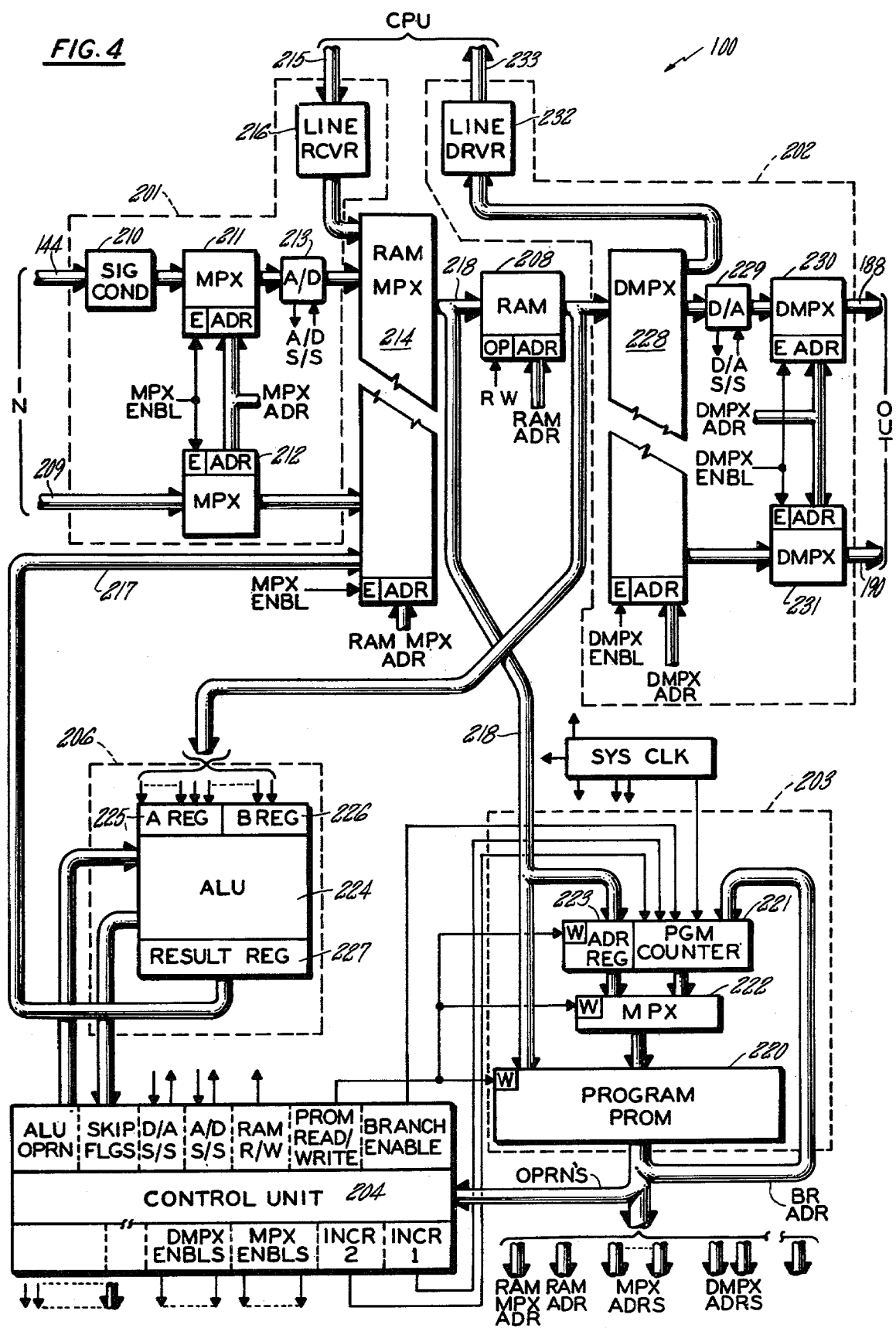
FIG. 4 is a simplified, schematic block diagram of a microprocessing system as may be used with the control system of the present invention.

Referring now to FIG. 4, the RMP 100 which is identical to the RMP 86 associated with the HVAC 18 (FIG. 2), and which may be used in implementing the control system of the present invention, is illustrated as having the architecture of a typical digital microprocessor system. The RMP is a combination of basic microprocessor elements including: input, output sections 201, 202 for receiving and transmitting data to and from the common thermal source 12 and CPU 26; a main memory section 203 for providing programmed instructions for the RMP through operand address programming; a control unit 204 for providing program control over RMP operation sequencing; an arithmetic unit 206 for providing the operational add, subtract, multiply, and divide functions of the RMP and a random access memory (RAM) 208 for providing memory storage of: the interim and final result outputs from the arithmetic unit 206, and all signal information from the input section 201 including sensed data from the common thermal source, or associated HVAC system, and CPU instruction commands.

The input section 201 receives the input analog sensed signals from the thermal source on the line 144, in addition to any discrete signals from the thermal source, such as temperature alarm limits, on a line 209. The analog signals on the line 144 are presented through signal conditioners 210 to the input of a multiplexer (MPX) 211 and the discrete signals on lines 209 are presented to the input of an MPX 212, both MPX's being under program control from the programmable memory 203. The output of the MPX 211 is presented to an analog-to-digital (A/D) converter 213 which exchanges start/stop commands with the control unit 204. The output of the A/D 213 and MPX 212 are presented to inputs of a RAM MPX 214 which also receives CPU signal information presented from the line 215 through a line receiver 216, in addition to the output from the arithmetic unit 206 on lines 217. The MPX 214 scans each of the input lines under a RAM MPX program address from memory 203 on command of MPX strobes generated by the control unit 204, and presents the information at each input through lines 218 to the RAM 208 which stores it in a memory location defined by the RAM address programming from the main memory. In addition, the output from the MPX 214 on the lines 218 is presented to the input of the main memory 203 to provide, under command of a program subroutine, access by the CPU to the main memory 203 for reprogramming the RMP operational instructions stored in the main memory.

The main memory section 203 includes a programmable read only memory (PROM) 220 normally responsive to the output of a program counter 221 presented through an MPX 222. The PROM 220 may actually comprise a read/write memory so as to be alternatively responsive to CPU interrupt or reprogramming instructions presented directly from the lines 218 to another input of the PROM 220 and indirectly through an address register 223 and the MPX 222 to the program counter input. The PROM 220 provides operand address programming for the RAM MPX 214, the RAM 208 address, and the program address for the multiplexers and demultiplexers (MPX, DMPX) of the input and output sections 201, 202. In addition the PROM 220 provides the operand addressing to the control unit 204 and the branch address to the program counter 221.

The arithmetic unit 206 includes an arithmetic logic unit (ALU) 224 which performs the selected mathematical or logic functions on the data presented from the RAM 208 through the operating A and B registers 225, 226. The result of the ALU operation is presented through a result register 227 to the input of the RAM MPX 214. The ALU operation, i.e. mathematical functions including add, subtract, multiply, and divide, or logic functions including compare etc., is selected by the control unit 204. The RAM operand address, which controls the data presented to the ALU from the RAM, is provided from the PROM. As may be required, SKIP FLAGS are generated by the ALU and presented to the control unit to provide PROM skip instructions as may be necessary during the particular mathematical operation being performed. The result data stored in the RAM 208 is presented to the CPU and to the HVAC system (on CPU request or PROM 220 program command) through a demultiplexer (DMPX) 228 which, under program control from the PROM 220, presents the common thermal source analog command signals, i.e. the input signals to the heating/cooling apparatus of the hot and cold sources 106, 108 (FIG. 3), through a digital-to-analog converter (D/A) 229 and DMPX 230 to the lines 136, 140 (FIG. 3) within the trunk line 188, the thermal source discrete signals through a DMPX 231 to the lines 132, 134, 138, and 142 within the conduit 190 of FIG. 3, and the data output to the CPU through a line driver 232 and lines 233. Both DMPX's 230, 231 are under program control from the PROM 220 and the D/A 229 exchanges start/stop strobes with the control unit 204.

In operation, as known to those skilled in the art, the MPX 214 reads all of the input data to the RMP 200 into the RAM 208 where it is stored at address locations determined by a RAM address program from PROM 220. The PROM scans and identifies all data entries to the RAM, both sensed discharge temperature information from the thermal source and inputs from the CPU, by ordering both stored data and stored control character code information from the RAM 208 into the A and B registers 225, 226 of the arithmetic unit 206. A PROM program subroutine then sequentially compares identifying characters contained within selected bytes of the information word with each of a plurality of identifying characters within the character code until the information word is identified. Depending upon the identification of the information word, the program may branch to various addresses as determined from the PROM 220 and the word may be returned to the same location in RAM or changed to a different address location. This may be accomplished through SKIP FLAGS dependent on results in the ALU 224 and presented to the control unit 204. A SKIP FLAG causes the program counter to increment two steps, such as to bypass a branch instruction; no SKIP FLAG causes an increment of one, allowing execution of the next sequential instructions (operational or branch). Use of various branch instructions enables the program to unconditionally branch to an address stored in PROM 220, to call up various subroutines as required for the program operation during normal running of the RMP.

The RMP includes a subroutine for identifying CPU program change instructions, wherein a first work from the CPU is presented through the MPX 214 into a RAM 208 memory location determined by the address program. The word is identified by the normal PROM scanning of the stored RAM data through the subroutine described hereinbefore. When identified as a CPU instruction, a PROM write strobe from the control unit 204 is presented to the address register 223 allowing entry into the register of the next word from the CPU appearing on the line 218 and containing the desired address location in PROM 220 of the new CPU instruction. A third word from the CPU, containing the instruction change information, is presented from the lines 218 to the input of the PROM 220 simultaneously with the presentation of a second PROM write strobe from the control unit 204 to the MPX 222 which allows the PROM 220 to read the address location stored in the register 223 together with the instruction word appearing at the input on the line 218. In this manner operating program instructions stored in the PROM 220 may be altered by CPU command. Similarly the values of operating constants for the inner loop control of the heating and cooling apparatus within the command thermal source, which are stored in the RAM 208, may similarly be changed on CPU instruction which orders the PROM 220 to pull out the appropriate constant stored in the RAM 208 and read in the new value of the constant from the CPU.

The RMP 100 is free running, i.e. asynchronous with the CPU, and scans the sensed analog and discrete input signals from the input section 201 at a rate typically ten times greater than that required by the CPU, i.e. typically the CPU receives data from the RMP every 10 seconds, and the RMP scans all of the data input lines and closes each of the proportional gain inner control loops of the thermal source every one second. The normal free running scan of the sensed parameters is interrupted for communication with the CPU, for both program change commands and commands for data read out from the RAM 208. The interrupt time represents approximately 5% of the total RMP running time. The CPU also interrupts the RMP to provide loading of CPU calculated temperature reference values into the RAM 208, to command the RMP 100 to provide comparison of the duct reference temperature with the stored sensed temperature values, and to generate the resultant error control signal to the appropriate valve or damper actuator within the HVAC system. The control procedures for the RMP 100 is stored in the PROM 220 while the RAM 208 stores both the sensed data and control character code subroutine information, in addition to providing scratch pad storage for the arithmetic unit 206. Similarly, specific data acquisition software, i.e. unique configuration tables for a specific control loop is loaded from the CPU and is stored in the RAM 208. Memory capacity for the RMP is typically 2K words of PROM and 4K words of RAM.

It should be understood that the RMP of FIG. 2 is illustrative of one configuration of a dedicated microprocessor system suitable for providing the data acquisition and front end processing of data for the CPU, and the specific architecture is dependent on a given particular implementation of the present invention and forms no part of this invention. Similarly, any suitable general purpose microprocessor known in the art and having the requisite characteristics, such as the industry standard model 8080A, may be used if desired with standard programming techniques.

Figure 5:
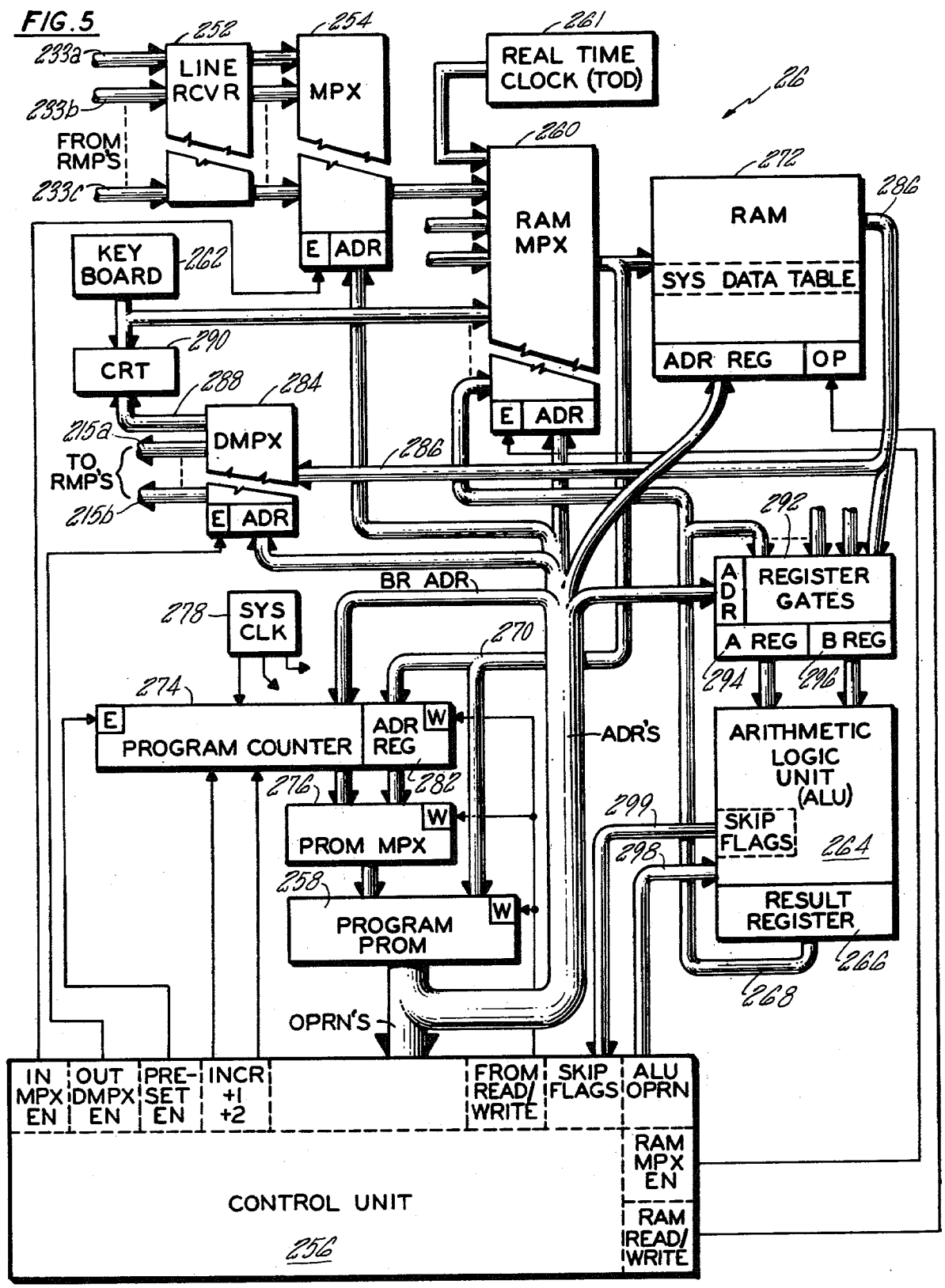
FIG. 5 is a simplified, schematic block diagram of a real time digital processing system as may be used with the control system of the present invention.

Referring now to FIG. 5, a central processing unit (CPU) 26 which may incorporate the central control function of the present invention is illustrated as representing the architecture of a typical, real time data processing system. Input data lines $233_a$-$233_c$ from each of a plurality of RMPs, such as the RMP 100 of FIG. 4, are presented through line receivers 252 to a corresponding one of a plurality of inputs of an MPX 254 which, when enabled by a strobe from a control unit 256, sequentially scans the input lines under address program control of a programmable read only memory (PROM) 258. Each of the input data signals are presented in turn through lines 259 to one input of a RAM MPX 260 which scans a plurality of RAM input data lines including: the output from a real time clock 261 which provides the time of day (TOD) with a timekeeping capability ranging from seconds to years, the output of a keyboard 262 presented through lines 263, and the output of an arithmetic logic unit (ALU) 264 presented through a result register 266 and set of lines 268. The RAM MPX 260 scans each of the input lines when enabled by a strobe from the control unit 256 under address control from the PROM 258, and presents the selected input data lines through a set of lines 270 to the input of a RAM 272 and to a write input of the PROM 258. The RAM 272 is similarly under an address program control from the PROM 258 and receives an operational code strobe (RAM READ/WRITE) from the control unit 256.

The control unit 256 responds to command inputs from the PROM 258 which in turn is under control of a program counter 274 presented through a PROM MPX 276. The program counter 274 receives the output of a system clock 278 which provides the CPU operating time base. The program counter 274 is also responsive to preset enable, and increment one, and increment two strobes from the control 256. The PROM MPX 276 is responsive to read/write control signals from the control unit 256 to present either the output of the program counter 274, or alternatively the output of an address register 282 to the input of the PROM 258. The address register 282 receives the output of the RAM MPX 260 on the lines 270 and is used in conjunction with a subroutine similar to that described hereinbefore with respect to the RMP 200 of FIG. 2, to provide reprogramming of the PROM 258 through keyboard 262 entry by a maintenance operator.

In addition to providing the address programming for the MPX's 254, 260 and the RAM 272, the PROM 258 also provides operational address programming for a demultiplexer (DMPX) 284 which presents the output from the RAM 272 on lines 286 to a plurality of output lines including lines 288 to a video display (CRT) 290 which provides visual display of input information presented through the keyboard 262 by the operator, and output data presented to the RMP from the CPU on lines $215_a$-$215_b$. The PROM 258 also provides the branch address to the program counter 274 and program address information to address register gates 292 which control the data flow into the A and B registers 294, 296 of the ALU 264.

The stored program within the PROM 258 is implemented through the control unit 256 which provides enabling strobes for the CPU multiplexers and demultiplexers in addition to providing operative read/write instructions to the RAM 272 and operation instructions (arithmetic, logic, compare, etc.) to the arithmetic unit 264 on lines 298. The control unit 256 receives instruction inputs to alter the PROM sequence from SKIP FLAGS generated in the ALU 264 and presented on the lines 299.

The real time data processing system of FIG. 5 represents one configuration of a dedicated hardware, real time data processing apparatus which may be advantageous for use in implementing the control system of the present invention where general purpose programming is neither required nor practical in view of the control functions to be performed. It should be understood, however, that the specific architecture is dependent on the particular implementation of the present invention, and forms no part of the present invention. If it is deemed necessary, or practical, any one of a number of well known processing systems may be used as may be obvious, or readily apparent, to those skilled in the art. As is more apparent in the light of detailed operational descriptions provided hereinafter, well known processing systems such as the Digital Equipment Corporation model PDP 1135 or 1140 general purpose computers used in combination with real time operating software such as the Digital Equipment Corporation RSX-11M real time software system, employing only programs provided through programming techniques well known in the art, may be utilized in conjunction with the remote microprocessor and the HVAC sensors and interface control equipment described hereinbefore.

The control of the present invention optimizes the operation of the hot and cold sources 106, 108 to reduce the actual energy consumption of each source to that level required to satisfy the highest thermal energy demand in the network, i.e. the HVAC system having the highest heating and/or cooling load. The control is provided individually to each of the sources and the operation of each source is autonomous and independent of the other, such that the control system may be utilized in a network requiring only a hot source, or a cold source. The optimization of each source is provided in four levels, ranging from a shut off of the source and its associated primary pump in addition to the related secondary pump in each of the HVAC systems, to a controlled, incremental increase in the energy output of the source as required to satisfy the given load condition. In all cases, the highest energy demand is determined in each of a plurality of successive short term intervals, or periods, and the source operation is adjusted accordingly in each of the periods.

The cooling or heating load demands are determined through the valve position of the respective hot and cold valve assemblies (34, 36 FIG. 2) of each of the HVAC systems (18-20 FIG. 1). The total range of valve position travel for the hot and cold valves from zero percent or full closed, to one hundred percent or full open, is quantized into four sub-ranges: a first range extending from zero to a minimum position limit ($D_{min}$), a second range extending from $D_{min}$ to a low position limit ($D_{low}$), a third range extending from $D_{low}$ to a high position limit ($D_{high}$), and a fourth range extending from $D_{high}$ to full open. In the control of the cold source 108, when all of the cold valves in each of the plurality of HVACs is at a position less than $D_{min}$ for some determined time interval, the cold source, its primary pump 112, and the associated cold fluid secondary pumps (32, FIG. 2) in each of the HVAC systems are turned off. For the condition wherein all of the HVAC cold valves are positioned at a value less than $D_{low}$, but at least one valve is positioned at a value greater than $D_{min}$, all for a determined time interval, the discharge temperature of the cold source is increased in degrees from its present commanded value by an incremental temperature value, thereby decreasing the cooling requirement and energy consumption of the cold source. When all of the HVAC cold valves are positioned at a value less than $D_{high}$, but at least one is positioned at a value greater than $D_{low}$, all for a determined time interval, the discharge temperature of the cold source is maintained at the present sensed discharge temperature value. Finally, for the condition where at least one of the valves is positioned at a value greater than $D_{high}$ for a determined time interval, the discharge temperature of the cold source is decreased in degrees by an incremental temperature value, to provide more cooling. All four levels provide optimization and a reduction in the source actual energy consumption, ranging from the obviously most optimum condition of complete shut off, to the least optimized condition of decreasing the cold source discharge temperature in increments, thereby incrementally increasing the cooling load on the source only as required to satisfy the short term interval demand of the network. The control of the hot source in response to the determined position of the hot valves in each HVAC within the described sub-ranges is identical, with the obvious exception of changing the discharge temperature by opposite polarity, incremental temperature values, i.e. decreasing the hot source discharge temperature in response to the second sub-range to decrease the heating load and hot source energy consumption, and increasing the hot source discharge temperature, thereby increasing the heating load, in response to the fourth sub-range.

In providing the four levels of optimization, the CPU (26 FIG. 1) receives the valve position information from each of the HVACs (18-20 FIG. 1) and determines which of the four optimization levels are to be provided. The RMP (100 FIG. 1) is then requested to initiate, and/or maintain, the selected one of the four operating levels for each source 106, 108 within the common thermal source 12. In the exemplary embodiment of the present invention it is assumed that the cold source provides chill water as the cold fluid, and the hot source provides hot water.

Figure 6:
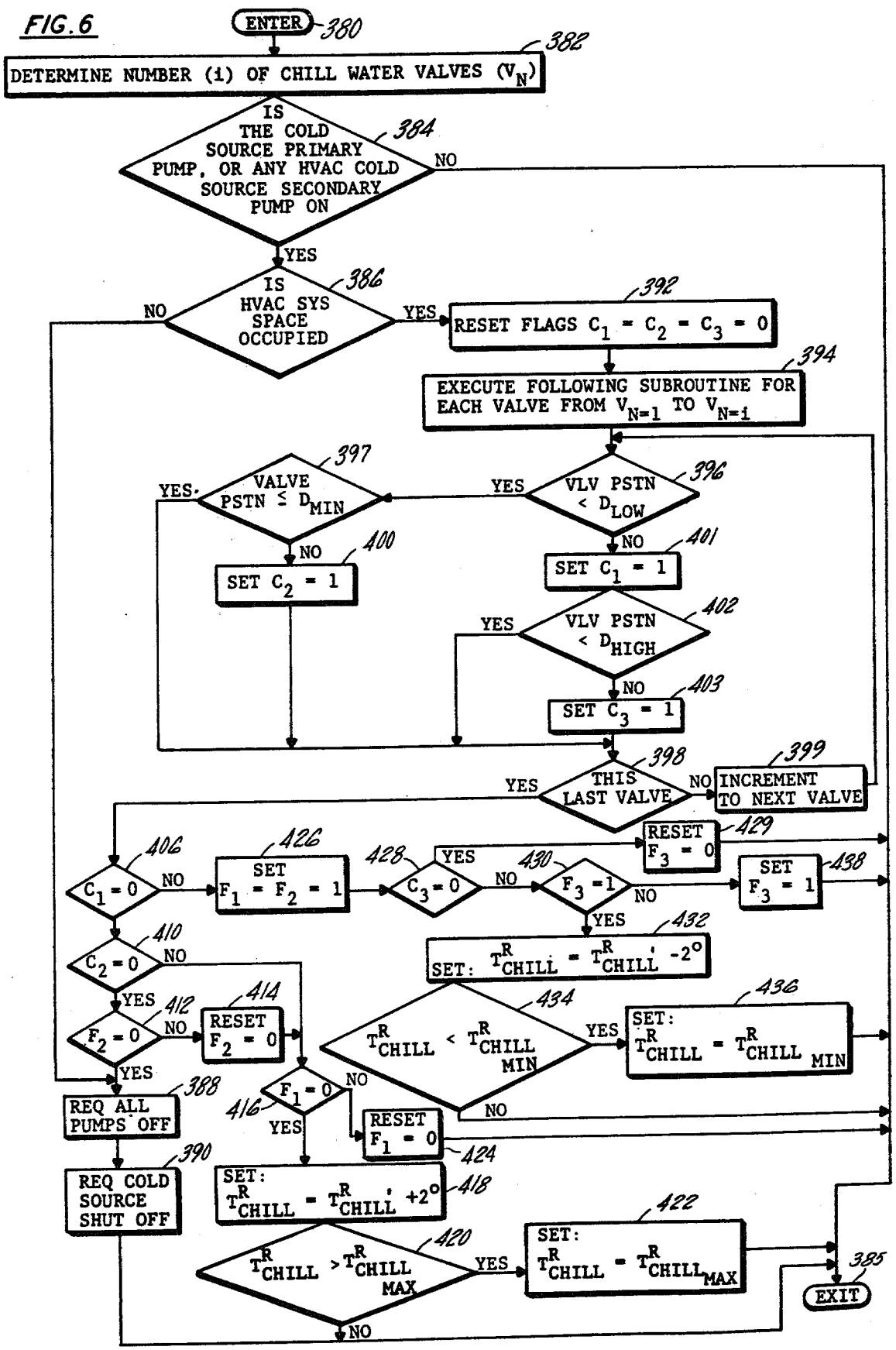
FIG. 6 is a logic flow chart illustration of the processing steps incorporated in one of the control functions of the control system of the present invention.

Referring now to FIG. 6, in a flow chart illustrative of the cold source optimization control provided by the CPU according to the present invention, the CPU enters the flow chart at 380, and instructions 382 request a determination of the number of chill water valves in the network, i.e. the number of HVAC systems serviced from the cold source 108 (FIG. 2). Instructions 384 next require the CPU to survey the RAM of each RMP in the system (the RMP 100 controlling the common thermal source 12, and the RMPs associated with each of the HVACs 18-20 in the network) to determine whether the cold source primary pump 112 (FIG. 3) or any of the several HVAC cold source secondary pumps are on. If neither the primary pump nor any of the secondary pumps are on, the CPU exits the flow chart at 385 since there is no requirement for cooling and optimization is unnecessary. If one or more of the cold source secondary pumps, or the primary pump are on, instructions 386 request a determination of the occupied status of any of the living spaces regulated by the several HVAC systems in the network. The occupancy status is determined by occupancy schedule information stored in the CPU RAM 272, which may be changed at any time by operator reprogramming of a portion, or all of the occupancy schedule via entry through the keyboard 262 (FIG. 5). The occupancy schedule information is compared with the time of day (TOD) provided by the real time clock 261 of FIG. 5 and, also stored in the CPU RAM. If the living spaces within the particular HVAC system whose secondary pumps are energized are not occupied, then instructions 388 request the CPU to transmit a command to the associated RMPs to shut off all pumps, both primary and secondary, and instructions 390 follow with a command to the CPU to request the RMP 100 (FIGS. 1, 4) to shut off the cold source 108. As described hereinafter, the shut off of the cold source may be provided with a discrete shut off signal to turn off the cooling apparatus of the source, or by commanding a chill water reference temperature ($T_{cw}{}^R$) which is so high that the cold source need not operate to provide the commanded discharge temperature. After requesting a shut off of the pumps and the cold source, the CPU again exits the flow chart at 385. If instructions 386 determine that the living spaces of the particular HVAC system whose secondary pumps are on, is occupied, the CPU then executes the optimization program control described hereinafter.

The optimization program begins with instructions 392 which request a reset of FLAGS $C_1$, $C_2$ and $C_3$ to zero. Instructions 394 next request the CPU to survey the RAM of the RMP associated with each of the HVAC systems (18-20 of FIG. 1) to determine the instant position of each HVAC chill water valve, one at a time, and to determine the position of each valve with respect to the four sub-regions described hereinbefore. Instructions 396, the first set of instructions in the subroutine, compares the position of the particular valve being examined with the $D_{low}$ value to determine if the valve position is less than the low limit value. If it is, instructions 397 next determine whether the valve position is less than, or equal to the $D_{min}$ value, and if so the CPU branches to instructions 398 which request a determination of whether this is the last chill water valve to be examined by the subroutine. If it is not the last valve, instructions 399 request the CPU to increment to the next valve and repeat the subroutine. If instructions 397 determine that the valve position is not less than or equal to $D_{min}$ instructions 400 request a setting of the $C_2$ FLAG to a one after which the CPU branches to instructions 398.

A YES answer to instructions 396 ensure that the valve position will fall either into the first or second subregion, and a YES answer to instructions 397 determines that the valve position is within the first sub-region which allows a shut off of all pumps and the cold source itself. A NO answer to instructions 397, resulting in the setting of the $C_2$ FLAG to a one, means that the valve is within the second sub-region.

If the comparison of valve position to the $D_{low}$ limit in instructions 396 result in a NO answer, instructions 401 request the CPU to set the $C_1$ FLAG equal to one, indicating that the valve position will not be within the first or second sub-regions, but rather in the third or fourth. Instructions 402 next request the CPU to compare the valve position with the $D_{high}$ limit to determine if the valve position is less than the high limit. If the valve position is less than CPU branches to instructions 398, however, if the valve position is not less, then instructions 403 request the CPU to set the $C_3$ FLAG equal to one indicating that the valve position is within the fourth sub-region.

Since the cold source 108 (FIG. 3) must provide chill water at a discharge temperature value adequate to satisfy the cooling load requirement of the worst case cooling load HVAC, the subroutine of instructions 396-403 determines the worst case condition and registers it through the setting of the C FLAGS. The resultant combination of FLAG settings is next decoded to determine which of the four operating levels of the cold source is permitted. For the condition where none of the C FLAGS have been set to one during the execution of the subroutine i.e. $C_1=C_2=C_3=0$, then the chill water source, primary pump, and HVAC secondary pumps may be turned off if the condition persists for a determined time interval. In the preferred embodiment of FIG. 6, the determined time is the time interval between successive executions of the flow chart, such that only if the C FLAGS are all set equal to zero through two successive runnings of the flow chart will the source and pumps be shut off. Typically the time interval, or repetition period is fifteen minutes. This is true for all four source operating levels, such that if the $C_3$ FLAG is set to one following the execution of the subroutine of instructions 396–403, regardless of the succeeding status of the remaining $C_1$ and $C_2$ FLAGS, the cold source may only be operated in the fourth level of operation if the condition persists for two successive runnings of the flow chart.

Following the execution of instructions 398 of the subroutine for the last chill water valve in the network, the flow chart of FIG. 6 next executes a decoding subroutine to determine: (1) the status of the C FLAGS as a result of the present survey of each valve position, and (2) whether or not a given C FLAG status has been maintained over two consecutive executions of the flow chart. Since the C FLAGS are reset to zero in each run of the flow chart by instructions 392 of the subrouting of instructions 396–403, a set of F FLAGS are used to register the C FLAGS status from consecutive executions of the flow chart. The F FLAGS are set, or reset only as a function of the change in status of the C FLAGS. Each of the F FLAGS, $F_1$–$F_3$ are associated with a respective one of the C FLAGS $C_1$–$C_3$.

The first set of instructions in the decoding subroutine, instructions 406, determine status of the $C_1$ FLAG. If the $C_1$ FLAG status is zero the answer to instructions 406 is YES, and the CPU knows that all of the valve positions surveyed are less than the $D_{low}$ limit. Instructions 410 next request a determination of whether or not the $C_2$ FLAG is set to zero. If the answer is YES instructions 412 request a determination of whether the $F_2$ FLAG is presently set to zero indicating that the $C_1$ and $C_2$ FLAGS were set at zero on the immediately preceding execution of the flow chart. If the $F_2$ FLAG is at zero the requirement that the C FLAG status be maintained for two successive runnings of the flow chart is satisfied, and the CPU is instructed to execute instructions 388, 390 shutting off all chill water pumps (both primary and secondary) and shutting off the cold source, after which the CPU exits the program listing at 385.

If instructions 412 determine that the $F_2$ FLAG is presently set to one, indicating that $C_2$ was not zero in the immediately preceding run of the flow chart, or if instructions 410 determine that the $C_2$ FLAG status is not zero in the present execution of the flow chart, then a shut off of the source and pumps is not permitted, however, depending upon the preceding status of the $C_1$ FLAG the source discharge temperature may be allowed to increase by an incremental temperature value thereby reducing the source energy consumption, therefore, following a NO answer on instructions 410, or following a YES answer to instructions 410, a NO answer to instructions 412, and a reset of $F_2$ to zero to register the present $C_2$ status for the next succeeding execution of the flow chart, the CPU executes instructions 414 to determine the status of the $F_1$ FLAG, i.e. is $F_1$ presently at zero indicating that $C_1$ was zero in the immediately preceding execution of the flow chart. If the $F_1$ FLAG is zero the CPU is requested by instructions 418 to set a new chill water reference discharge temperature $(T_{chill}^R)$ equal to: $T_{chill}^R = T_{chill}^{R'} + 2°$, where $T_{chill}^{R'}$ is the present chill water reference temperature value. The 2° incremental temperature value increase in the chill water reference value allows the cold source to provide the chill water at a higher discharge temperature, thereby reducing the cooling load and reducing the actual energy consumption of the source. The 2° incremental temperature value is typical, and may be changed as required for a given HVAC network, or given set of operating conditions. Following the setting of the new chill water reference temperature value, instructions 420 determine whether the new chill water reference value is greater than the maximum value $(T_{chill\ max}^R)$, and if it is, instructions 422 request a setting of the chill water reference to the maximum value. Following instructions 420, and if necessary 422, the CPU again exits the program listing at 385.

If instructions 416 determine that the $F_1$ FLAG is not zero, indicating that the $C_1$ FLAG status has not been maintained at zero for the required two successive running of the flow chart, the chill water reference temperature cannot be increased and the CPU next executes instructions 424, setting the $F_1$ FLAG to zero to register the status of the $C_1$ FLAG at zero in the present run of the flow chart. Following instructions 424 the CPU exits the program at 385.

If instructions 406 determine that the $C_1$ FLAG is not zero in the present running of the flow chart, then it is known that at least one chill water valve is at a position greater than $D_{low}$. Since the source and pumps cannot be turned off, or the chill water reference temperature increased by 2° unless all valves are less than the $D_{low}$ limit for two successive executions of the flow chart, a NO result for instructions 406 is followed by instructions 426 requesting the CPU to set the $F_1$ FLAG and $F_2$ FLAG to one, registering the status of the $C_1$, $C_2$ FLAGS for the next succeeding execution of the flow chart. Following instructions 426, instructions 428 determine whether the $C_3$ FLAG is equal to zero. If it is, then there is at least one chill water valve in the network which is at a position greater than $D_{low}$, but all valves are less than the $D_{high}$ limit, and the operating level for the cold source is to leave the chill water reference temperature at its present value. Therefore, a YES answer to instructions 428 is followed by instructions 429 which request a reset of the $F_3$ FLAG to zero thereby registering the $C_3$ FLAG status in the present execution of the flow chart, after which the CPU exits the program at 385. If the $C_3$ FLAG is set at one, indicating that in the present run of the flow chart there is at least one chill water valve at a position greater than $D_{high}$, instructions 430 next determine whether the $F_3$ FLAG is presently set at one indicating a $C_3$ equal to one setting on the immediately preceding run. If $F_3$ is one then instructions 432 request a decrease in the chill water reference temperature to satisfy the increased cooling load requirement of the network, and the discharge temperature reference is set to: $T_{chill}^R = T_{chill}^{R'} - 2°$, where $T_{chill}^R$ is the present chill water reference temperature value. As discussed hereinbefore with respect to the +2° incremental change, the −2° change is typical, and the incremental temperature value decrease in chill water temperature may be changed to any other incremental value deemed suitable for the particular source and network. Following the setting of the new chill water reference temperature, instructions 434 determine whether the new reference temperature is less than the minimum value. If not, the CPU exits the flow chart at 385, and if the present reference value is less than instructions 436 set the chill water reference value at the minimum limit. If instructions 430 indicate that the $F_3$ FLAG is not one indicating that the present $C_3$ equal to one status has not been maintained for two successive running of the flow chart, then the chill water reference cannot be decreased and instructions 438 request a setting of the $F_3$ FLAG to one to register the present status of the $C_3$ FLAG for the next succeeding run of the flow chart.

The flow chart of FIG. 6 is executed at periodic intervals, typically every fifteen minutes, and the actual positions of the chill water valves are monitored in each interval to determine whether or not the operating level of the cold source set in the immediately preceding execution of the flow chart satisfies the network cooling load demand. The requirement that the C FLAG settings be maintained over two successive executions of the flow chart before any change is made in the cold source operating level ensures that transient operation of the cold source is minimized, thereby preventing unnecessary waste and energy consumption, and also ensures that the cold source cooling output will only be increased as necessary to satisfy the highest cooling load of any HVAC in the network. Even for the maximum cooling demand condition, where one or more HVAC systems have chill water valve positions greater than $D_{high}$, the chill water discharge temperature is still only decreased in incremental temperature values, each followed by a survey of the chill water valve positions to determine if the incremental temperature change satisfied the cooling load demand. This provides for the minimum cooling output from the source, thereby permitting a reduction in the control energy consumption by the cold source over that provided by the prior art control systems. In addition, the optimization control according to the present invention allows for further energy saving in that the operating efficiency of the cold source is improved when allowed to operate at high discharge temperature values, i.e. a typical 1.5% increase in efficiency is provided for each one degree increase in the chill water discharge temperature. Furthermore the shut off of the cold source and primary and secondary pumps when all of the chill water valves in the network are positioned below $D_{min}$ reduces the wear on the chill water valve assemblies by reducing the pressure on the valves, thereby extending the useful life of the valves. Also, the control of the cold source to the highest discharge temperature permitted in satisfaction of the network cooling demand, allows for a reduction in the temperature gradient between the chill water and the outside ambient air, resulting in lower transmission temperature loss of the chilled water through the pipes to the various HVACs in the network.

The flow chart of FIG. 6, illustrates the optimization control of the cold source which includes: (1) the determination of the short term interval position of each of the chill water valves in the HVAC network, and (2) a decoding of the valve position to determine the worst case, or highest cooling load demand in the network. The CPU determines through the decoding subroutine which of the four levels of cold source optimization may be provided. Typical values of the valve position limits which provide the quantized sub-ranges of the total valve position range of travel, are: $D_{min}=0\%$, $D_{low}=45\%$, and $D_{high}=65\%$. As stated hereinbefore, the incremental temperature value, typically plus or minus two degrees as illustrated in FIG. 6, is selectable and may be changed to accommodate the given HVAC network conditions, both physical layout and seasonal operating conditions. The temperature incremental value may be readily changed through operator reprogramming of the CPU via the keyboard 262 (FIG. 5).

Figure 7:
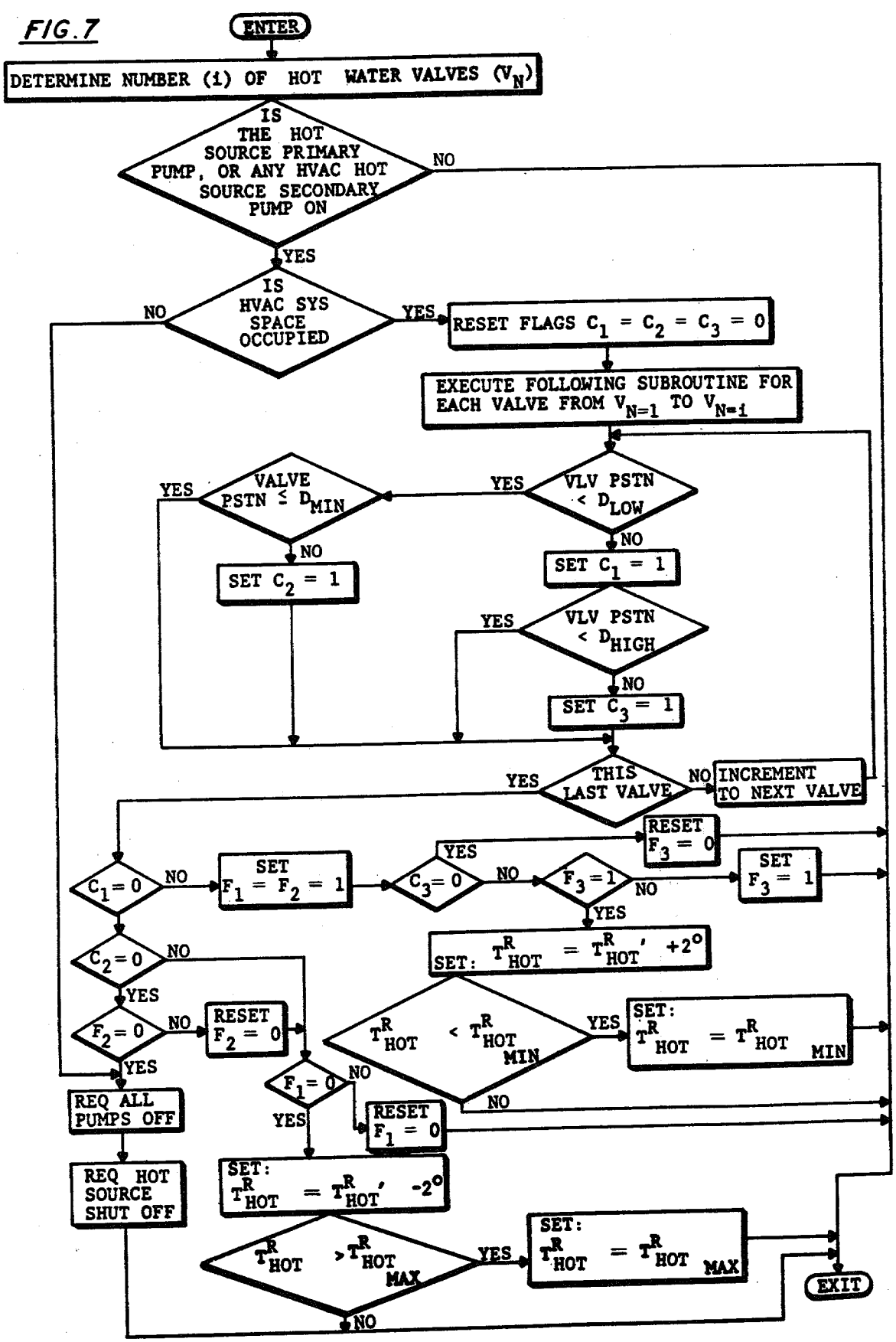
FIG. 7 is a logic flow chart illustration of alternative processing steps for the control function illustrated in FIG. 6.

The optimization control over the hot source 106 (FIG. 3) is illustrated in the flow chart of FIG. 7 and is identical to that illustrated in FIG. 6 for the cold source with the exception of: (1) the change in designation from COLD or CHILL to read HOT, and (2) wherein the incremental change in hot water discharge temperature reference ($T_{hot}{}^R$) is made in temperature increments of two degrees which are opposite in polarity to those of FIG. 6, instructions 418, 432. The polarity change is obvious since a reduction in heating load demand would allow a decrease in the hot water discharge temperature, as opposed to the analogous condition of a decrease in the cooling load which allows an increase in the chilled water discharge temperature value. The optimization control of the hot source is provided in response to the actual position of the hot water valves in each HVAC in relation to the identical position limit sub-ranges of hot water valve position ($D_{min}$, $D_{low}$, and $D_{high}$) as that described hereinbefore for the chill water valves. Similarly, the sub-ranges for the hot source, as is true for the sub-ranges of the cold source, are changeable by reprogramming of the CPU by the operator through keyboard entry.

Figure 8:
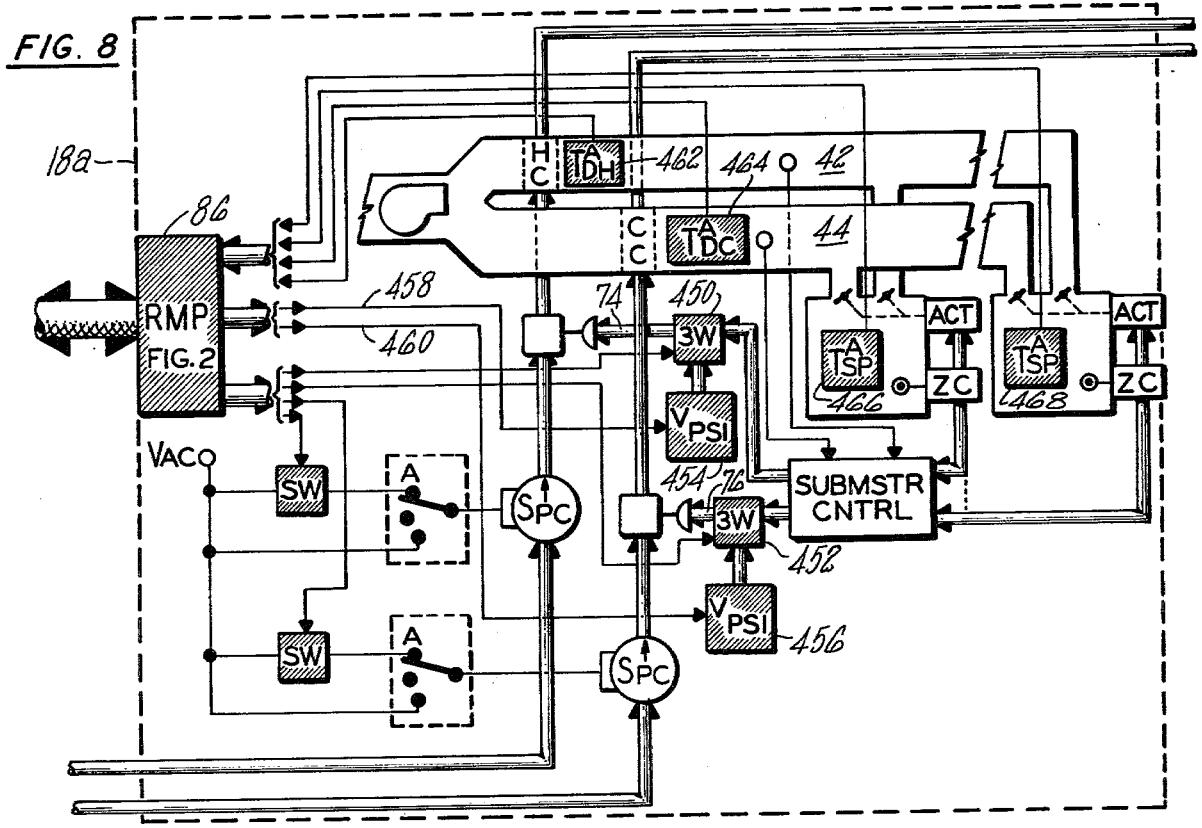
FIG. 8 is a schematic block diagram illustration of an HVAC system as may be included in the network of FIG. 1, including alternative interface apparatus to that illustrated in FIG. 2.

As stated hereinbefore, a preferred embodiment of the thermal source optimization control of the present invention is to use the optimization control in combination with the central control over the operation of each of the individual HVAC systems in the network, as shown and described in the hereinbefore referenced copending application to Games et al. The combined use is preferred since the central control over HVAC performance itself provides a reduction in the control energy consumption of each of the HVAC systems, and the interface apparatus required between each HVAC and the central control of Games et al, including the use of an RMP associated with each HVAC, may be used directly with the CPU of FIG. 1 without the addition of any further interface equipment. Referring now to FIG. 8, in a centrally controlled HVAC system $18_a$ of the type disclosed by Games et al the control of the submaster control 68 over the position of the hot and cold valves 34, 36 is interrupted by installing three-way valves 450, 452 in combination with associated electropneumatic transducers 454, 456 in the pneumatic lines 74, 76. The three-way valves and electropneumatic transducers are of a type known in the art, and the installation, interconnection, and operation between the valves, transducers, RMP, and the CPU is described in detail in the hereinbefore referenced, copending application to Games et al, which is expressly incorporated by reference into the present application. As disclosed therein, the electropneumatic transducers 454, 456 receive analog input signals on lines 458, 460 from the RMP 86. The analog signals are representative of desired valve position values which are provided by the central control (i.e. the CPU 26 of FIG. 1) in response to sensed, actual discharge temperatures from the hot and cold decks 42, 44 provided by dedicated sensors 462, 464 respectively, and in response to sensed actual space temperatures provided by dedicated sensors 466, 468. Since analog signal magnitude is representative of the commanded chill and hot water valve position, the CPU 26 (FIG. 1) is capable of determining the position of the valves 34, 36 implicitly through interrogation of the RAM in the RMP 86, rather than through the addition of further interface equipment such as the position sensing circuitry 88, 90 of FIG. 2.

The flow charts of FIGS. 6, 7 cause the CPU to set a reference discharge temperature for the chill water ($T_{chill}{}^R$) and hot water ($T_{hot}{}^R$) provided from the cold and hot sources respectively. Actual control of the discharge temperature of the cold and hot source is provided by control over the respective cooling and heating apparatus by the RMP 100 through a strictly proportional gain loop. As may be known, the proportional gain alone results in a "droop error" characteristic due to the necessity of an ever present error term required to provide the control output signal. This is undesirable in a high accuracy system where control is desired to tenths of a degree. To overcome the droop error of the RMP proportional gain loop, the CPU provides the RMP with a chill water temperature reference ($T_{CW}{}^R$), each distinct, and different from the chill water reference discharge temperature ($T_{chill}{}^R$) and hot water reference discharge temperature ($T_{hot}{}^R$) provided in the flow charts of FIGS. 6, 7, but each having a magnitude dependent on the sum of the temperature difference between the respective reference discharge temperature and the associated actual discharge temperature provided by the sensors 118, 120 (FIG. 3), multiplied by each of a proportional gain constant and an integral gain constant. The CPU calculated the chill water and hot water reference discharge temperatures in a routine separate from that of FIGS. 6, 7. The routine is identical for each, and is illustrated in FIG. 9 for the calculation of the chill water reference.

Figure 9:
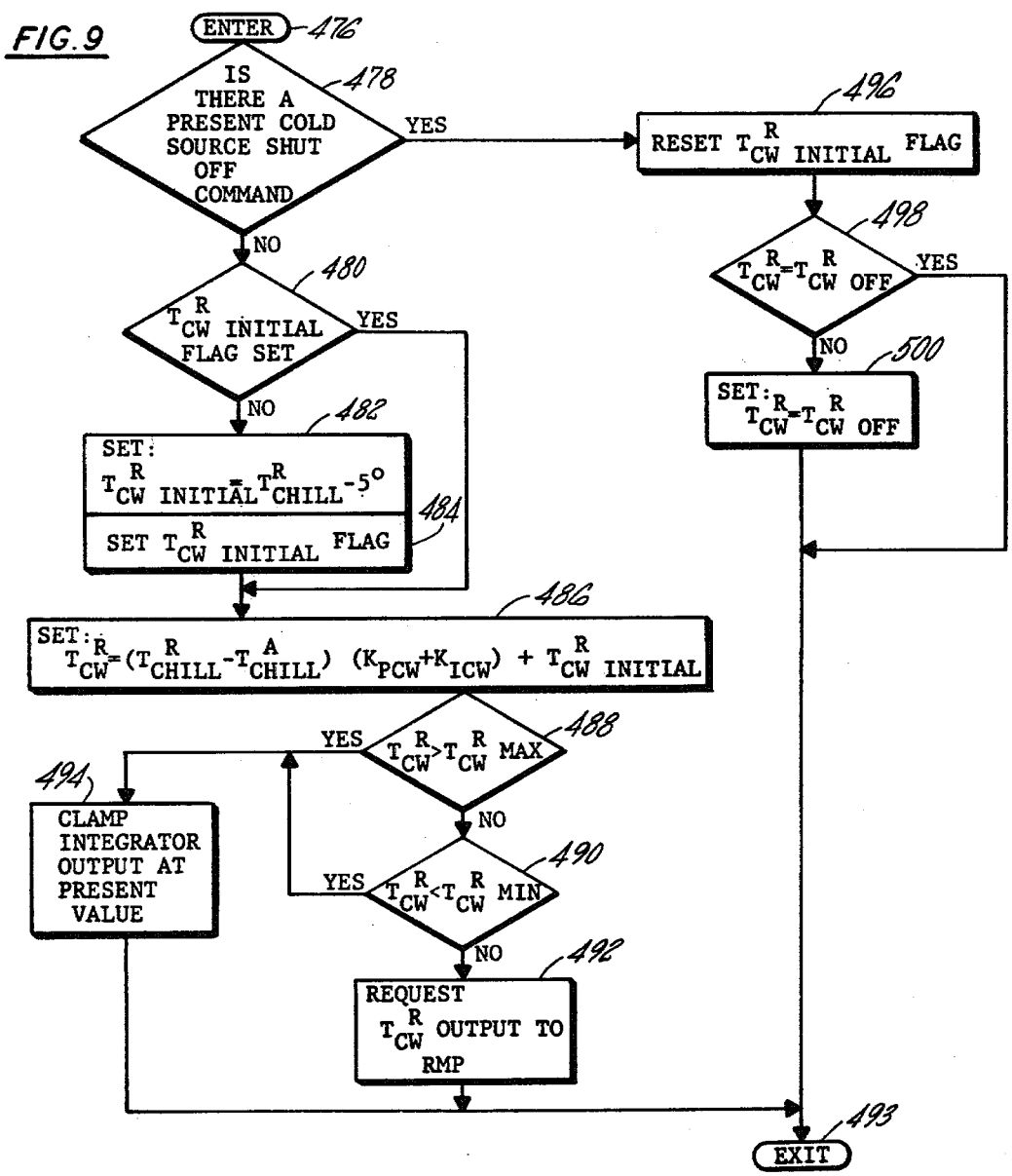
FIG. 9 is a logic flow chart illustration of the processing steps incorporated in another control function of the control system of the present invention.

Referring now to FIG. 9, in a flow chart illustrative of the CPU calculation of the chill water reference temperature ($T_{CW}{}^R$), the CPU enters the flow chart at 476 and instructions 478 request a determination of whether or not there is a present cold source shut off command (as may be provided by instructions 390 of FIG. 6). If the answer is NO, indicating cold source actuation in response to a present network demand for cooling, instructions 480 next request a determination of whether or not the $T_{CW}{}^R$ INITIAL FLAG is set. This INITIAL FLAG is an indicator within the CPU which, when set, indicates that this is the first $T_{CW}{}^R$ output from the CPU to the RMP 100 following a turn on of the cold source. Information on whether or not this is the initial reference value is required in order that the CPU provide an initial chill water reference temperature value which is colder (lower in temperature) by a determined amount to account for the initial "droop error" characteristic. Therefore, following a NO answer to instructions 480, instructions 484 request that the first chill water value ($T_{CW}{}^R$) INITIAL is set equal to $T_{chill}{}^R - 5°$. The $-5°$ temperature increment is selected based upon the gain characteristics of the proportional loop controlling the cooling apparatus, and may be set equal to any value deemed suitable or necessary depending upon the given cooling apparatus characteristics. Following instructions 482, instructions 484 request a setting of the $T_{CW}{}^R$ INITIAL FLAG, registering the fact that the initial value has been set. Following instructions 484, or following instructions 480 if the initial FLAG had already been set, instructions 486 request the CPU to set a chill water reference temperature:

$$T_{CW}{}^R = (T_{chill}{}^R - T_{chill}{}^A)(K_{PCW} + K_{ICW}) + T_{CW}{}^R \text{ INITIAL}$$

where $T_{chill}{}^R$ is the reference chill water value set by FIG. 6, $T_{chill}{}^A$ is the sensed actual discharge temperature provided by the sensor 120 (FIG. 3), $K_{PCW}$ (°F./°F.) is a proportional gain constant, $K_{ICW}$(°F./°F.-min) is an integral gain constant, and $T_{CW}{}^R$ INITIAL is the value set in instructions 482. The value of the proportional and integral gain constants are determined with consideration given to the gain and transient temperature characteristics of the particular cooling apparatus used in the cooling source and may be changed by the operator, as required, through keyboard entry to the CPU. The use of the integral gain constant ($K_{ICW}$) allows for the elimination of the "droop error" characteristic of the strictly proportional loop, thereby allowing the setting of an actual chill water discharge temperature ($T_{chill}{}^A$) equal to the chill water reference discharge temperature ($T_{chill}{}^R$) from the flow chart of FIG. 6. Following instructions 486, instructions 488, 490 request a comparison of the chill water reference value set in instructions 486, with maximum and minimum chill water temperature limits stored in the CPU RAM 272 (FIG. 5). If the chill water reference value of instructions 486 is within the max/min limits, instructions 492 request the CPU to output the chill water reference value to the RMP, and the CPU exits the flow chart at 493. If the set value of chill water reference exceeds either the max, or min limit, instructions 494 request the CPU to hold the value of the integral term of the expression of instructions 486 (that accumulated in the CPU integrator which implements the integral gain constant $K_{ICW}$) to its present value, i.e. the integral value stored in the integrator prior to the setting of the new reference temperature in instructions 486, after which the CPU exits the program at 493. If after entering the flow chart of FIG. 9, instructions 478 determine that there is a present cold source shut off command from instructions 390 of FIG. 6, instruction 496 request a reset of the $T_{CW}{}^R$ INITIAL FLAG, indicating for instructions 480 that on the next turn on of the cold source the CPU will output an initial value. Following instructions 496, instructions 498 determine whether or not the chill water reference is set to an OFF value ($T_{CW\,OFF}{}^R$) and if so the CPU exits the program at 493, if not, the CPU sets the chill water reference to the OFF value in instructions 500 and then exits the program.

The flow chart of FIG. 9 illustrates the CPU calculation of the cooling apparatus reference temperature which is required to provide the desired reference chill water discharge temperature of FIG. 6. The control by the CPU of the heating apparatus of the hot source 106 (FIG. 3) is identical to that of FIG. 9 and is not illustrated. As may be obvious, the designation of the hot source parameters in addition to an initial hot water reference temperature which is five degrees higher than the value of $T_{hot}{}^R$ provided in FIG. 7 would be required.

Figure 10:
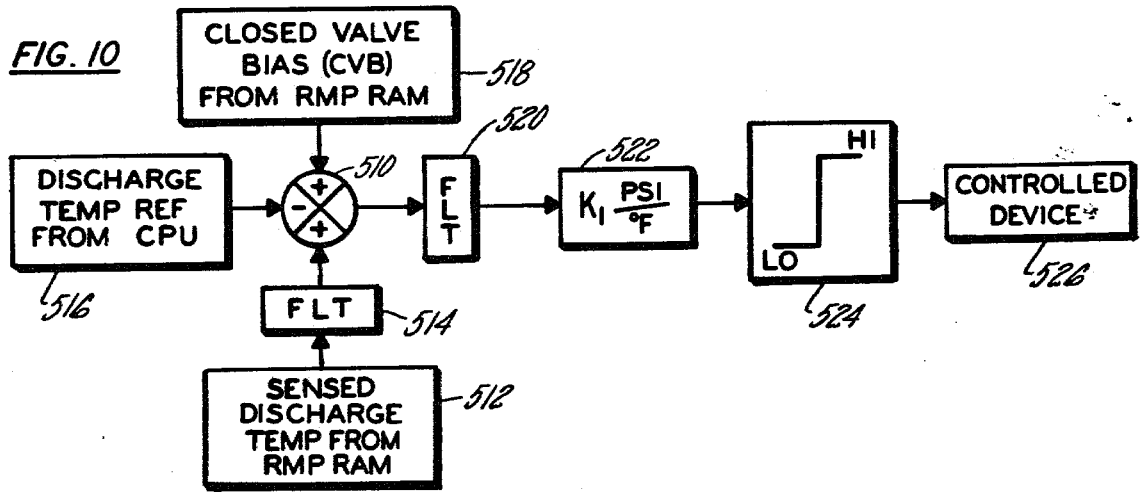
FIG. 10 is a simplified block diagram of a proportional gain control loop used in combination with the control system of the present invention.

The RMP 100 receives the chill water reference ($T_{CW}{}^R$), and the hot water reference temperature ($T_{HW}{}^R$) from the CPU 26 and provides the proportional gain control loop which controls the operation of the respective cooling and heating apparatus in the sources. Referring now to FIG. 10, in a simplified block diagram illustration of the proportional control loop provided by the RMP over the cooling apparatus of the cold source, a summing junction 510 provides a summation of the difference temperature between: the actual chill water discharge temperature 512 received from the sensor 120 (FIG. 3) and presented through a digital low pass filter 514 of a type known in the art for eliminating high frequency noise pickup, the chill water reference temperature ($T_{CW}{}^R$) 516 presented from the CPU, and a closed valve bias (CVB) 518 stored in the RMP RAM 208 (FIG. 4). In the RMP control loop for the heating apparatus of the hot source, the summing junction 512 would receive the actual hot water discharge temperature at 512 from the sensor 118 (FIG. 3), and the hot water reference temperature ($T_{HW}{}^R$) from the CPU at 516. The output of the summing junction is presented through a second low pass digital filter 520 to the input of a proportional gain circuit 522 which provides a proportional gain constant and scale factor conversion from temperature degrees to the required control units (depending upon the type of cooling apparatus used). The output from the circuit 522 is presented to a threshold limit circuit 524 which provides the maximum and minimum limits for the control range of the corresponding control device. The output signal from the limit circuit 524 is presented to the input of the respective control device 526, which as described hereinbefore may include modulating the position of the mixing valve providing the lithium bromide to the mixer stage of a steam absorption type of chiller, or alternatively the position of a steam valve providing steam to the evaporator stage. Similarly for the electrical centrifugal chiller the control device may be the electrical signal commanding position of inlet/outlet guide vanes within the compressor.

As stated hereinbefore, the optimization control of the present invention provides for a reduced control energy consumption by a common thermal source which provides a thermal fluid to one or more HVAC systems in the network. The thermal source may be either a cold source, a hot source, or both the optimization control of the present invention being provided autonomously to control each source to the lowest thermal energy output allowed in satisfaction of the short term, or short time interval demand from the highest thermal demand HVAC in the network. In addition to providing reduced control energy consumption by the respective sources, the control allows for increased efficiency of operation of the source by reducing its respective hot and/or cold load, in addition to reducing the wear of system components in the network such as the chill and hot water valves in each of the HVAC's of the network. The hot and cold sources may be of any type known in the art, together with their associated heating and cooling apparatus. When the optimization control of the present invention is used in combination with the HVAC central control described in the hereinbefore referenced, copending application to Games et al, a total energy conservative control is provided which provides a substantial decrease in the control energy consumption of the total network. Similarly, although the invention has been shown and described with respect to exemplary embodiments thereof, it should be understood by those skilled in the art that the foregoing and various other changes, omissions and additions in the form and detail thereof may be made therein and thereto without departing from the spirit and the scope of the invention.

Having thus described typical embodiments of our invention, that which we claim as new and desire to secure by Letters Patent is:

1. Apparatus for controlling the discharge temperature of thermal fluid presented from a common thermal source to one or more HVAC systems in a network, each HVAC controlling the volume of thermal fluid circulating therethrough in dependence on the thermal energy demand from temperature regulated living spaces associated with each by position modulation of an associated HVAC fluid valve apparatus over a total valve position range from a full closed position for a minimum volume to a full open position for maximum volume, the apparatus comprising:

position sensing means, for providing actual valve position signals for the fluid valve apparatus associated with each HVAC system;

temperature sensing means, adapted to be disposed in the common thermal source, for providing an actual discharge temperature signal; and electronic processing means, responsive to said position sensing means and said temperature sensing means, for providing in response to said actual valve position signals a signal manifestation having a magnitude representative of the highest HVAC system thermal energy demand in the network, said processing means further providing control of the common thermal source to provide modulation of the source discharge temperature in dependence on said signal manifestation magnitude.

2. The apparatus of claim 1 wherein said electronic processing means further comprises:

means for storing signals, including a proportional gain signal, an integral gain signal, and an initial discharge temperature signal; and wherein said electronic processing means provides a source reference discharge temperature signal at a magnitude in dependence on said initial source reference discharge temperature signal and said signal manifestation magnitude, said processing means comparing said source reference discharge temperature signal with said actual discharge temperature signal to provide a discharge temperature error signal in response to a temperature difference therebetween, said processing means further providing a fluid reference temperature signal having a magnitude proportional to the sum of the signal product of said discharge temperature error signal multiplied by said proportional gain signal and the time integral of said discharge temperature error signal multiplied by said integral gain signal, said processing means comparing said fluid reference temperature signal with said actual source discharge temperature signal to provide a discharge temperature control signal representative of the temperature difference therebetween, said processing means providing said control signal to the common thermal source for modulating the source discharge temperature in dependence on said discharge temperature control signal magnitude.

3. The apparatus of claim 2 wherein said electronic processing means further comprises:

means for successively sampling periodically and registering in said means for storing, successively sampled values of said actual valve position signals and said actual source discharge temperature signal; and wherein said electronic processing means provides and registers in said means for storing, in each sampling period, said signal manifestation, said processing means comparing said signal manifestation in each sampling period with that registered in a preceding sampling period to provide, in response to equal magnitude signal manifestations in each of two consecutive sampling periods, a temperature change signal at a magnitude and polarity in dependence on said equal magnitude of said signal manifestations, said processing means accumulating a summation of said temperature change signals in said means for storing, said processing means providing said source reference discharge temperature signal in each sampling period at a magnitude proportional to the sum of said initial discharge temperature signals and said summation of said temperature change signals accumulated in a present sampling period.

4. The apparatus of claim 3 wherein said processing means compares said source reference discharge temperature signal from each sampling period with said actual source discharge temperature signal in a related period to provide said discharge temperature error signal in each sampling period; and wherein said electronic processing means provides said time integral of said integral gain signal and said discharge temperature error signal in each sampling period, integrated over the time interval of the related sampling period, said processing means accumulating a summation thereof in said means for storing, said processing means further providing said fluid reference temperature signal in each sampling period at a magnitude in dependence on the signal summation of the product of said discharge temperature error signal related to said sampling period multiplied by said proportional gain constant and said summation of said time integrals accumulated in said sampling period.

5. The apparatus of claim 3 wherein:

said means for storing signals further includes valve position reference signals, each representative of different valve position values within the total HVAC valve position range, which in combination define one or more consecutive sub-ranges of valve position extending from the full closed position to the full open position, each sub-range bounded by a lower limit defined by a more closed valve position reference signal and an upper limit defined by a more open valve position reference signal, said means for storing further including increment temperature signals, one each associated with a different one of said sub-ranges, and each representative of a different increment temperature magnitude and polarity; and wherein said electronic processing means provides said signal manifestation in each sampling period at a magnitude in identification of that sub-range having said upper and lower limits which bound the most open of said actual valve position signals sampled in the period, said processing means providing said temperature change signal at a magnitude and polarity equal to that one of said increment temperature signals associated with the sub-range identified by said equal magnitude signal manifestations in each of two consecutive sampling periods.

6. The apparatus of claim 5, further comprising:

means responsive to operator control for providing parameter signals representative of said valve position reference signals and said temperature increment signals, in response to selective operation thereof; and wherein said electronic processing means further includes means for registering said parameter signals in said means for storing.

7. The apparatus of claim 6 wherein said means responsive to operator control further provides parameter signals representative of said proportional gain signal and said integral gain signal.

8. The apparatus of claim 5, wherein said valve position reference signals include a minimum position signal, a low position signal, and a high position signal at successively more open valve position values for providing a first sub-region extending from the full closed position to said minimum position, a second sub-region extending from said minimum position to said low position, a third sub-region extending from said low position to said high position, and a fourth sub-region extending from said high position to the full open position; and wherein said increment temperature signals include, a first signal associated with said first sub-region and having a magnitude and polarity selected to provide a turn off of the common thermal source, a second signal associated with said second sub-region and having a magnitude and polarity selected to provide modulation of the source discharge temperature in that direction associated with a decreasing thermal demand from the network, a third signal associated with said third sub-region and having a magnitude and polarity selected to provide no change in the quiescent value of the actual source discharge temperature signal, and a fourth signal associated with said fourth sub-range and having a magnitude and polarity selected to provide modulation of the source discharge temperature in that direction associated with an increasing thermal demand from the network.

9. A method of controlling, with electronic processing means, the discharge temperature of a common thermal source which provides a thermal fluid to one or more HVAC systems in a network, each HVAC system controlling the volume of thermal fluid circulating therethrough in dependence on the thermal energy demand from temperature regulated living spaces associated with each by position modulation of an associated fluid valve apparatus over a total valve position range from a full closed position for a minimum volume to a full open position for a maximum volume, comprising the steps of:

sensing the actual discharge temperature of the thermal source, and the actual valve position of the fluid valve apparatus associated with each HVAC system, and providing signals representative thereof to the electronic processing means;

establishing a desired number of consecutive sub-ranges within the total valve position range and a desired number of common source operating modes, by introducing to the electronic processing means temperature reference signals and signals representative of each of said sub-range limits, said temperature reference signals each having a different increment temperature value and polarity and each associated with a different one of said sub-ranges, and by further introducing into the electronic processing means a desired control function definitive of the desired discharge temperature control characteristics; and modulating the common source discharge temperature to change the temperature value in response to said actual valve position signals, said actual discharge temperature signal, said sub-ranges, and said temperature reference signals, in a manner dependent on said control function.

10. The method of claim 9 wherein said control function includes a proportional gain function and an integral gain function.

11. The method of controlling the discharge temperature of thermal fluid presented from a common thermal source to one or more HVAC systems in a network, each HVAC controlling the volume of thermal fluid circulating therethrough in dependence on the thermal energy demand from temperature regulated spaces associated with each by position modulation of an associated HVAC fluid valve apparatus over a total valve position range from a full closed position for a minimum volume to a full open position for a maximum volume, comprising the steps of:

periodically sensing the actual discharge temperature and the actual valve positions of the valve apparatus associated with each HVAC system in the network;

determining the position value of the most open of said actual valve positions in each period;

providing a source reference discharge temperature signal at a magnitude in dependence on the position value of said most open of said actual valve position signals;

comparing said reference discharge temperature signal with said actual discharge temperature to provide a discharge error signal at a magnitude in dependence on the temperature difference therebetween; and presenting said discharge error signal to said common source to provide modulation of the source discharge temperature in dependence on the magnitude of said discharge error signal.

* * * * *

UNITED STATES PATENT AND TRADEMARK OFFICE
CERTIFICATE OF CORRECTION

PATENT NO. : 4,187,543
DATED : February 5, 1980
INVENTOR(S) : David M. Healey and John E. Games It is certified that error appears in the above-identified patent and that said Letters Patent are hereby corrected as shown below:

Column 6, line 4 "26" should be --86--

Column 19, line 57 "484" should be --482--

Signed and Sealed this

Twenty-eighth Day of October 1980

[SEAL]

Attest:

SIDNEY A. DIAMOND

Attesting Officer

Commissioner of Patents and Trademarks